United States Patent [19]

Marcell

[11] 4,108,279
[45] Aug. 22, 1978

[54] DISPENSER AND METHOD FOR APPLYING LUBRICANT OR OTHER MATERIAL TO THE INTERIOR OF A CONDUIT

[75] Inventor: William B. Marcell, Fort Myers Beach, Fla.

[73] Assignee: Thomas Industries of Tennessee, Inc., Matthews, N.C.

[21] Appl. No.: 734,234

[22] Filed: Oct. 20, 1976

[51] Int. Cl.² ............................................... F16N 9/00
[52] U.S. Cl. .................................. 184/15 R; 118/408; 15/104.16
[58] Field of Search ..................... 184/1 R, 1 E, 15 R, 184/16; 118/408, 254, 105, 306, DIG. 10; 15/104.16

[56] References Cited

U.S. PATENT DOCUMENTS

| | | | |
|---|---|---|---|
| 2,362,881 | 11/1944 | Canney et al. | 118/105 X |
| 3,055,339 | 9/1962 | Pistole et al. | 118/408 |
| 3,438,461 | 4/1969 | MacPherson | 184/1 R |
| 3,858,687 | 1/1975 | Masarky et al. | 184/1 E X |
| 3,885,521 | 5/1975 | von Arx | 118/DIG. 10 X |

FOREIGN PATENT DOCUMENTS

| | | | |
|---|---|---|---|
| 494,013 | 5/1954 | Italy | 118/254 |
| 894,574 | 4/1962 | United Kingdom | 118/405 |

*Primary Examiner*—David H. Brown
*Attorney, Agent, or Firm*—Bell, Seltzer, Park & Gibson

[57] ABSTRACT

A dispensing device is pulled through a conduit while a coating material, such as a lubricant, is forcibly dispensed from the dispensing device and spread along the interior surface of the conduit. The dispensing device has an elongate tubular body with a hollow interior portion adapted for containing a supply of the coating material and having an opening in the body through which the coating material is dispensed. An elongate connector extends axially into the hollow interior of the elongate body through the leading end thereof and is connected to a piston located inside the hollow body. When the dispensing device encounters a frictional resistance as it is pulled through the conduit, the piston is pulled forwardly in the hollow body to forcibly dispense coating material from the dispenser and the dispenser thereafter spreads the coating material along the wall of the conduit.

4 Claims, 6 Drawing Figures

U.S. Patent  Aug. 22, 1978  4,108,279
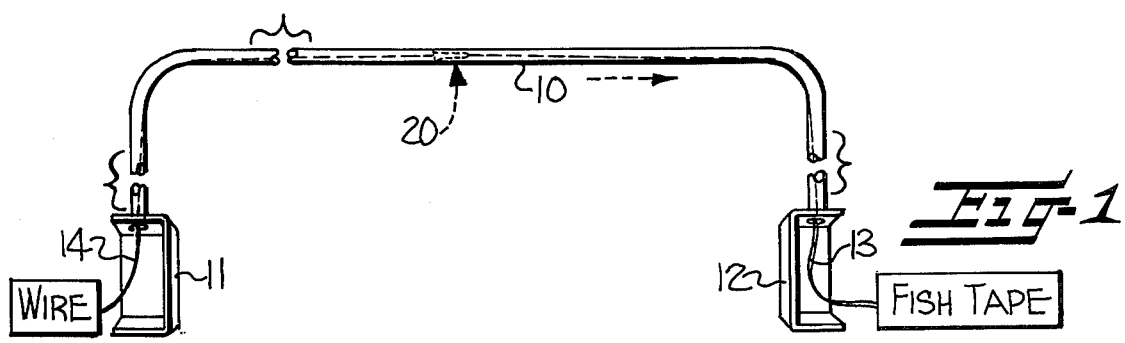
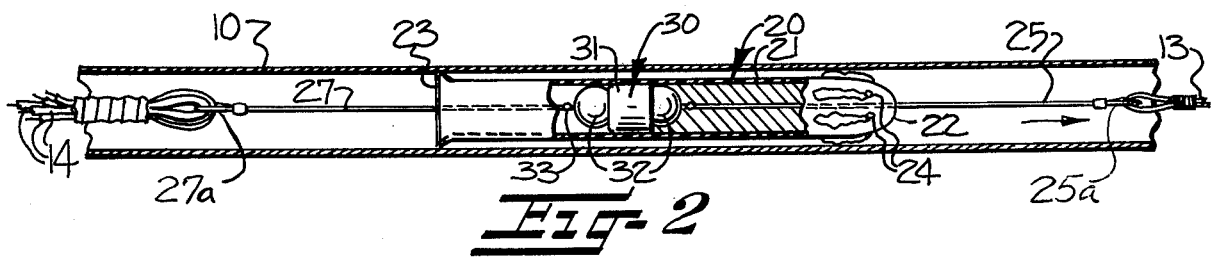
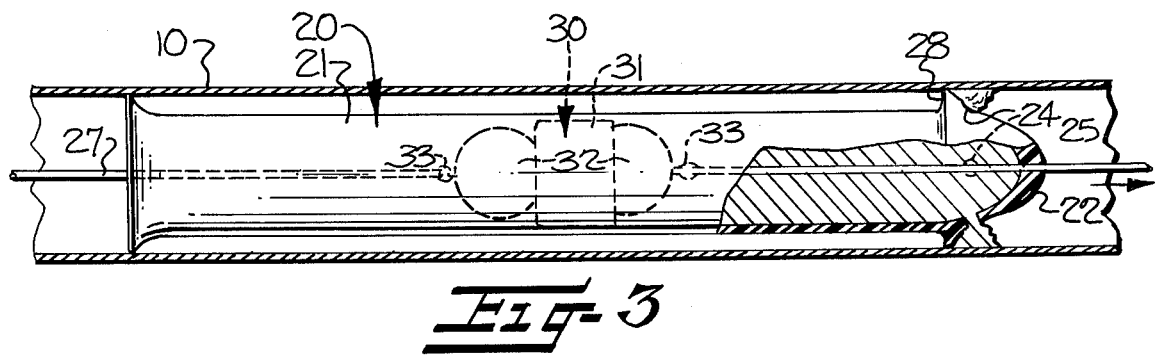
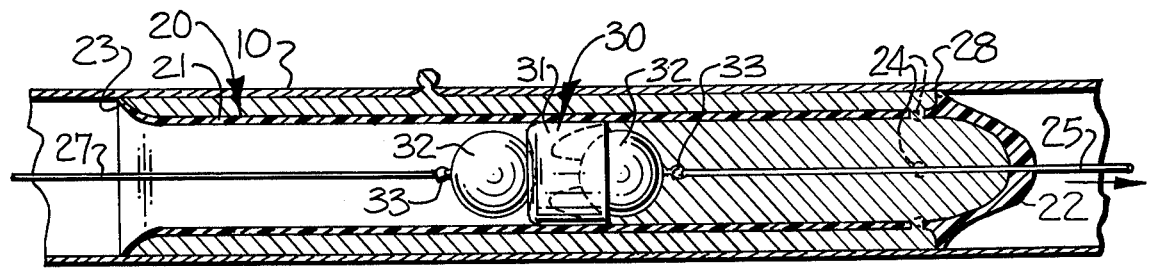
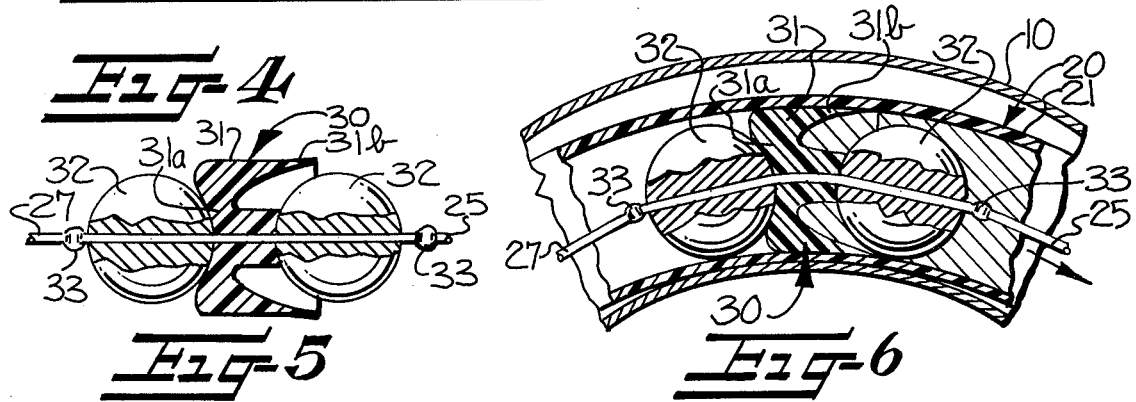

DISPENSER AND METHOD FOR APPLYING LUBRICANT OR OTHER MATERIAL TO THE INTERIOR OF A CONDUIT

This invention relates to a device and method for applying a coating material along the interior surface of a conduit, and is especially useful for lubricating the interior of an electrical conduit to facilitate passing an electrical conductor therethrough.

Electrical conductors such as individual wires or cables are conventionally installed in electrical conduits by passing a fish tape, cord, rope or other pulling implement through the conduit, attaching the electrical conductor to the pulling implement, and then pulling the electrical conductor back through the conduit with the pulling implement. Often, especially where the conduit has one or more bends therein, it is necessary to use a lubricant in the conduit to reduce the force required to pull the conductors through the conduit as well as to avoid breaking the conductors or damaging the insulation thereon.

In the past, the lubricant has been applied manually by the worker feeding the conductor into the conduit during the pulling operation. As the wire is drawn into the conduit, it is stopped every several feet while the worker manually applies the lubricant to the conductor. This is a rather messy and unpleasant task for most workers. Additionally, manual application of the lubricant to the conductor is very inefficient. A substantial portion of the lubricant applied to the wires is lost between the wires rather than remaining on the surface thereof and is therefore never utilized for lubrication during the pulling operation. Additionally, particularly on long runs, much of the lubricant is wiped from the conductor before it reaches the end of the conduit. Thus, where a bend is located near the far end of the conduit, very little lubricant may be remaining on the wire by the time it reaches the bend.

Another method of applying lubricant in an electrical conduit is disclosed in MacPherson U.S. Pat. No. 3,438,461 issued Apr. 15, 1969. This patent discloses a flexible mesh-like dispensing package containing a supply of lubricant and designed for attachment between a fish tape and the electrical wire which is to be pulled through the conduit. As the dispensing package and wire is pulled through the conduit, the pulling force applied to opposite ends of the package elongates and peripherally contracts the mesh-like dispenser package, thereby squeezing lubricant therefrom in the path of the wire being pulled. While the method and device disclosed in the MacPherson patent eliminates the need for manually applying lubricant to a wire during the pulling operation, it provides no assurance that the lubricant will be applied where it is needed, i.e., on the walls of the conduit. Moreover, the lubricant is dispensed from the package in the form of a bead or stream of lubricant onto the wire being pulled behind the dispenser. Significant amounts of the lubricant may be lost between the wires being pulled rather than remaining along the walls of the conduit where the lubricant is needed most.

Additionally, since the lubricant is dispensed in accordance with the amount of pulling force applied to opposite ends of the dispenser, excessive and unnecessary amounts of lubricant may be dispensed as a result of binding of the wire downstream from the dispenser or at the entrance to the conduit, or as a result of jerking the fish tape when pulling the wire through the conduit.

The present invention provides a dispensing device and method which is particularly suited for applying lubricant along the interior of an electrical conduit attendant to the installation of an electrical conductor in the conduit, and which overcomes the disadvantages associated with the aforementioned prior practices.

In accordance with the present invention, a dispensing device is provided which is adapted for passage through a conduit ahead of an electrical conductor being pulled therethrough and which dispenses lubricant while spreading the same along the interior surface of the conduit to provide a lubricant coating to facilitate installing the electrical conductor in the conduit.

In accordance with the present invention, the amount of lubricant dispensed is increased when the dispenser encounters an increased frictional resistance to passage through the conduit. This results in applying an increased amount of lubricant exactly where it is needed most. Unlike the dispensing device of the aforementioned prior patent, the amount of lubricant dispensed in accordance with the present invention is governed by the frictional drag of the dispenser against the conduit wall, and not by the amount of pulling force exerted on the dispenser. Thus, binding of the wire downstream, or jerky uneven pulling does not undesirably affect the amount of lubricant dispensed.

When employed for applying lubricant in an electrical conduit, the dispensing device of this invention is adapted to be attached to a pulling implement such as a fish tape with the electrical conductor secured to the other end of the dispensing device. The device contains a supply of lubricant therein and is adapted to dispense the lubricant and spread a coating of the same along the interior surface of the conduit during movement of the dispenser through the conduit ahead of the attached electrical conductor.

The dispenser has a flexible body with a void therein adapted for containing a supply of the lubricant, and with egress means communicating with the void for dispensing of the lubricant from the body. An elongate connector extends into the body from one end thereof and has a portion thereof adapted for securement to a pulling implement for pulling the dispenser through the conduit. Another portion of the connector engages the flexible body and forces lubricant therefrom in response to the dispenser encountering frictional resistance to passage through the conduit.

More particularly, in the preferred form of the invention the dispensing device comprises an elongate tubular body of external dimensions adapted to pass through the conduit. The tubular body has a hollow interior portion adapted for containing a supply of lubricant or other coating material therein and has one or more openings adjacent the leading end of the body through which the coating material is dispensed. An elongate connector such as a cable extends axially into the hollow interior portion of the elongate body through the leading end thereof. A loop or eye is formed on a portion of the cable located outside of the hollow body to permit securing the same to a fish tape or other suitable pulling implement for pulling the dispensing device through the conduit. Inside the hollow tubular body is a piston which is connected to the connector cable and which is movable relative to the hollow body when a pulling force is exerted on the cable relative to the elongate tubular body to thereby force lubricant from the hollow interior portion of the tubular body as the dispensing device is pulled through the conduit. One or more fins provided on the exterior of the hollow body engages the interior surface of the conduit and spreads the dispensed lubricant to form a substantially uniform coating thereof along the conduit. The lubricant dispensed from the dispensing device is governed by the frictional drag of the dispenser against the conduit wall. Thus, when the dispensing device encounters an increased resistance in the conduit, such as would occur at a bend in the conduit, the increased resistance results in the dispensing of an additional amount of lubricant in this portion of the conduit.

In addition to its usefulness in lubricating the interior surface of an electrical conduit, the dispensing device of this invention may also be employed for applying other types of coating materials along the interior surface of a conduit. In accordance with one embodiment of the invention, the exterior of the tubular body is provided with fins adjacent the leading and trailing ends thereof. The coating material is dispensed through openings in the body located between the pair of fins and is confined between the fins in contact with the wall of the conduit. As additional coating material is forced from the dispenser by the piston, the coating material confined between the fins is pressurized. This embodiment of the device is particularly suitable for dispensing a sealant composition for sealing small splits or holes in a conduit such as a water pipe.

Some of the objects, features and advantages of the invention having been stated, others will appear as the description proceeds when taken in connection with the accompanying drawings, in which FIG. 1 is a schematic illustration of the way in which electrical wires are installed in an electrical conduit by pulling with a fish tape;

FIG. 2 is a side view, partially in section, showing one form of a dispensing device in accordance with this invention;

FIG. 3 is a view similar to FIG. 2 but on a somewhat larger scale and showing another form of dispensing device in accordance with this invention;

FIG. 4 is a view similar to FIG. 3 showing still another form of dispensing device in accordance with this invention;

FIG. 5 is an enlarged detailed view, partially in section, showing details of the piston in the dispensing device; and FIG. 6 is an illustration of how the piston behaves when passing through a bend in the conduit.

Referring now more particularly to the drawings, FIG. 1 shows a typical installation in a commercial or industrial building wherein an electrical conduit 10 extends between and interconnects two electrical junction boxes 11, 12. In order to install electrical wires in the conduit 10 between the junction boxes 11, 12, a pulling implement 13 such as a conventional steel or plastic fish tape is first pushed through the conduit 10 from the junction box 12 until it emerges at the opposite end of the conduit at the junction box 11. An electrical conductor 14 in the form of one or more wires or cables is then pulled back through the conduit using the pulling implement 13.

In accordance with this invention, a dispensing device 20 is secured between the pulling implement 13 and the conductor 14 and is pulled through the conduit by the pulling implement ahead of the attached electrical conductor. The dispensing device 20 dispenses and applies a substantially uniform coating of lubricant along the interior surface of the conduit to facilitate pulling the electrical conductor 14 through the conduit.

Referring more particularly to the structure of the dispensing device 20 as illustrated in FIG. 2, the device includes an elongate tubular body 21 formed of suitable flexible material such as plastic having a closed leading end 22 and an open trailing end 23 with a hollow interior portion therebetween adapted for containing a supply of fluent coating material such as lubricant. Adjacent the leading end of the body is provided at least one and preferably a plurality of circumferentially spaced openings 24 through which the coating material may be dispensed.

Located inside of the hollow tubular body is a piston assembly, generally indicated at 30 which is movable within the hollow body and defines an enclosed variable size chamber between the piston and the leading end of the hollow body.

A length of thin flexible cable 25 extends into the hollow body through an opening provided in the leading end 22 thereof and is connected internally of the dispensing device to the piston assembly 30. The cable 25 serves as a connector for connecting the dispensing device to the pulling implement 13. The end portion of the cable 25 located outside of the dispenser 20 is preferably provided with means such as a loop 25a by which the cable 25 may be easily secured to the pulling implement 13 for pulling the dispenser through the conduit. Another length of cable 27 extends from the piston assembly rearwardly and through the open trailing end 23 of the body 21. Suitable means such as a loop 27a is also provided on the end portion of this portion of cable 27 to facilitate securing the same to the electrical conductor 14.

As shown in FIG. 2, it will be seen that as the dispenser is pulled through the conduit by the pulling implement 13, the forward pulling force exerted on the piston assembly 30, together with the frictional drag exerted on the tubular body 21 causes the piston assembly 30 to be pulled forwardly in the body 21, thereby reducing the volume of the chamber in the interior of the body and forcing lubricant out of the dispenser through the openings 24. As illustrated, the body 21 is of smaller external dimensions than the internal diameter of the conduit 10. However, the trailing end portion 23 of the body is flared outwardly to define a fin of larger external dimensions than the remainder of the body 21. The fin engages or wipes the interior surface of the conduit and serves to spread the lubricant along the surface of the conduit as a substantially uniform coating when the dispenser 21 is pulled through the conduit. The flared trailing end 23 of the conduit additionally serves to help guide the piston assembly 30 back into position inside the tubular body 21 after refilling of the dispenser with lubricant.

An alternate form of the dispenser is illustrated in FIG. 3. In this embodiment, an additional fin 28 is provided adjacent the leading end of the tubular body 21 with the openings 24 being located forwardly of the additional fin 28. The two fins serve to insure a uniform application of lubricant along the interior surface of the conduit.

While the foregoing discussion has been particularly directed to the application of a lubricant to the interior of an electrical conduit, the dispensing device and method of this invention may also be employed for applying other types of coating material along the interior of a conduit. The embodiment of the invention illustrated in FIG. 4 for example is suited not only for applying lubricant coatings, but is also particularly suited for applying other types of coating materials such as a sealant coating for example.

As illustrated in FIG. 4, the tubular body 21 has the additional fin 28 located adjacent the leading end of the body, with the holes 24 being located behind the fin 28. When the coating material is dispensed from the body 21 under pressure by forward movement of the piston 30, it is confined between the fins. As additional coating material is forced into the confined area between the fins, the coating material is pressurized. This arrangement is particularly suited for sealing any leaks or holes in a conduit by applying a hardenable sealant from the dispenser. As the dispenser is pulled through the pipe, the pressurized sealant is forced through any small leaks or holes which may be present in the pipe as shown in FIG. 4. Upon exposure of the sealant to air, the sealant will harden and close the leak. The forward fin 28 also serves to clear the interior surface of the conduit of debris prior to application of the coating material.

Referring now more particularly to piston assembly 30, as illustrated in detail in FIG. 5 the piston assembly includes a washer 31 with a pair of spherical spacers 32 positioned on opposite sides of the washer. Washer 31 is preferably cup-shaped as shown, having a relatively heavy walled medial portion 31a with peripheral sidewalls 31b being of tapered wall thickness to provide greater flexibility and more effective sealing. The concave or hollow portion of the cup-shaped washer faces forwardly toward the closed leading end of the tubular body 21 so that pressure created inside the lubricant containing chamber assists in forcing the thin-wall peripheral side portions 31b of the cup washer outwardly into tight sealing engagement with the body 21. It will be noted that the rear side of washer 31 is also slightly concave. When a pulling force is applied to the cable 25, the rearmost spacer 32 bears against the concave rear side of washer 31 and assists in forcing the thin wall peripheral sealing portions of the washer outwardly into tight sealing engagement with the body 21.

The spherical spacers 32 assist in maintaining the washer 31 in tight sealing engagement with the body 21 during bending or flexing as the dispenser passes through a curve in the conduit by insuring that the pulling force of the cable 25 is applied to the center of the washer 31. Note FIG. 6 for example. This also prevents the washer from becoming unseated and turning sideways inside the hollow body 21. The washer 31 and spacers 32 have an axial opening therethrough as shown in FIG. 5 through which the cable 25 passes. The piston assembly is fastened securely to the cable 25 by retaining abutments 33 which are crimped or otherwise suitably secured to the cable.

In the drawings and specification, there have been set forth preferred embodiments of this invention, and although specific terms are employed, they are used in a generic and descriptive sense only and not for purposes of limitation.

That which is claimed is:

1. A dispensing device adapted for passage through a conduit while applying a lubricant coating material along the interior surface of the conduit to facilitate pulling an electrical conductor through the conduit, said device comprising a flexible body of predetermined external configuration conforming substantially to the interior diameter of the conduit so as to pass through the conduit while engaging the interior surface thereof, said body having a void in the interior thereof adapted for containing a supply of lubricant coating material therein and having egress means communicating with the void for dispensing of the lubricant coating material from the body, an elongate connector extending into said body from one end thereof and being longitudinally movable relative to said body, one end portion of said connector extending outside of said body and being adapted for securement to a pulling implement to facilitate pulling the dispensing device through the conduit, means carried by another portion of said elongate connector and engaging said body and cooperating therewith to force lubricant coating material from the body through said egress means in response to said body encountering frictional resistance to passage through the conduit, and means cooperating with said connector at the end thereof opposite the end to which the pulling implement is attached for facilitating connecting an electrical conductor thereto so that the dispensing device with attached electrical conductor trailing therebehind may be pulled through the conduit by the pulling implement.

2. A dispensing device adapted for passage through a conduit while applying a coating material along the interior surface of the conduit, said device comprising an elongate tubular body of external dimensions adapted to pass through the conduit, said tubular body having a hollow interior portion adapted for containing a supply of the coating material therein and having a plurality of openings at circumferentially spaced locations adjacent the leading end thereof communicating with the hollow interior portion of the body and through which the coating material may be dispensed, said elongate tubular body being of an external dimension smaller than the diameter of the conduit and including fin means adjacent the trailing end thereof and extending radially outwardly for engaging the interior surface of the conduit to spread the coating material along the interior surface of the conduit as the dispensing device travels therethrough, said tubular body also including an additional fin means adjacent the leading end thereof and rearwardly of said openings, the respective fin means serving to insure a uniform application of coating material along the entire interior surface of the conduit, an elongate connector having a portion thereof extending axially into the hollow interior portion of said elongate body from one end thereof and being longitudinally movable relative to said body, means provided on a portion of said connector located outside of said body to permit securing the connector to a pulling implement to facilitate pulling the dispensing device through the conduit, and piston means carried by said connector interiorly of the hollow body, and piston means being movable relative to said body in response to said body encountering frictional resistance to passage through the conduit to thereby force coating material from the hollow interior portion of the body as the dispensing device is pulled through the conduit.

3. A lubricant dispensing device adapted for passage through an electrical conduit while applying a lubricant coating along the interior surface of the conduit to facilitate installing an electrical conductor in the conduit, said device comprising an elongate flexible tubular body of an external diameter adapted for passage through the conduit and having a hollow interior portion adapted for containing a supply of the lubricant therein, said tubular body having a closed leading end, an open trailing end providing access to the hollow interior portion of the body to facilitate filling the same with lubricant, and a plurality of openings adjacent the closed leading end of the body through which the lubricant may be dispensed, the trailing end of said tubular body being flared outwardly to define a fin adapted for engaging the interior surface of the conduit and spreading the lubricant coating therealong as the dispensing device passes through the conduit, an elongate cable having a portion thereof extending axially into the hollow interior portion of said tubular body through the closed leading end thereof and being longitudinally movable relative to said body, a loop formed in the end portion of said cable located outside of said body to facilitate securing the cable to a pulling implement for pulling the dispensing device through the conduit, piston means located interiorly of said hollow body and connected to said cable and being forwardly movable relative to said body when the body encounters a frictional resistance to passage through the conduit to thereby force the lubricant coating from the hollow interior portion of the body as the dispensing device is pulled through the conduit, and cable means connected to said piston means and extending rearwardly from said body through the open trailing end thereof and having a loop formed in an end portion thereof to facilitate securing the cable to an electrical conductor so that the dispensing device with attached electrical conductor trailing therebehind may be pulled through the conduit by the pulling implement.

4. A dispensing device according to claim 3 wherein said piston means comprises a flexible washer, and spacer means provided on opposite sides of said flexible washer, said cable passing through and being secured to said spacer means, and said spacer means serving to prevent displacement of the flexible washer from said sealing engagement with the interior walls of the hollow body.

* * * * *

UNITED STATES PATENT AND TRADEMARK OFFICE
CERTIFICATE OF CORRECTION

PATENT NO. : 4,108,279
DATED : August 22, 1978
INVENTOR(S) : William B. Marcell

It is certified that error appears in the above-identified patent and that said Letters Patent are hereby corrected as shown below:

Column 3, Line 6, after "The" insert --amount of--.
Column 6, Line 50, CLAIM 2, after "said" insert --hollow--.

Signed and Sealed this

Sixth Day of March 1979

[SEAL]

Attest:

RUTH C. MASON
Attesting Officer

DONALD W. BANNER
Commissioner of Patents and Trademarks